(12) United States Patent
Luedeke et al.

(10) Patent No.: US 9,940,140 B2
(45) Date of Patent: Apr. 10, 2018

(54) SYSTEMS AND METHODS OF RESETTING A PROCESSOR

(71) Applicant: FREESCALE SEMICONDUCTOR, INC., Austin, TX (US)

(72) Inventors: Thomas Henry Luedeke, Oberbergkirchen (DE); Dirk Moeller, Zornediong (DE)

(73) Assignee: NXP USA, Inc., Austin, TX (US)

( * ) Notice: Subject to any disclaimer, the term of this patent is extended or adjusted under 35 U.S.C. 154(b) by 145 days.

(21) Appl. No.: 15/022,645

(22) PCT Filed: Mar. 19, 2014

(86) PCT No.: PCT/IB2014/059964
§ 371 (c)(1),
(2) Date: Mar. 17, 2016

(87) PCT Pub. No.: WO2015/040504
PCT Pub. Date: Mar. 26, 2015

(65) Prior Publication Data
US 2016/0232008 A1    Aug. 11, 2016

(30) Foreign Application Priority Data
Sep. 18, 2013 (WO) .................. PCT/IB2013/058639

(51) Int. Cl.
*G06F 1/24*    (2006.01)
*G06F 9/44*    (2018.01)
*G06F 1/08*    (2006.01)

(52) U.S. Cl.
CPC .............. *G06F 9/4401* (2013.01); *G06F 1/08* (2013.01); *G06F 1/24* (2013.01)

(58) Field of Classification Search
CPC ..................................... G06F 1/08; G06F 1/24
See application file for complete search history.

(56) References Cited

U.S. PATENT DOCUMENTS

| 6,118,306 | A | 9/2000 | Orton et al. |
| 6,658,597 | B1 * | 12/2003 | Ker .......................... G06F 11/24 |
| | | | 714/14 |
| 8,283,962 | B2 | 10/2012 | Kwon et al. |
| 2006/0103436 | A1 | 5/2006 | Saitou |
| 2006/0112263 | A1 | 5/2006 | Chu et al. |

FOREIGN PATENT DOCUMENTS

| CN | 101470501 A | 12/2010 |
| JP | 2000066760 A | 3/2000 |

OTHER PUBLICATIONS

International Search Report for the International application No. PCT/IB2014/059964 dated Aug. 21, 2014.

* cited by examiner

*Primary Examiner* — Albert Wang

(57) ABSTRACT

The invention relates to a method of resetting a processor, the method comprising the receiving of a reset signal indicating that one or more parts of said processor need to be reset, and forwarding of said reset signal to said parts to be reset. The forwarding of the reset signal is delayed for a period of time for at least one of the parts to be reset. The clock frequency of at least one of the parts to be reset is gradually decreased during said period of time. In this way the total activity of the processor device is gradually decreased so as to avoid an on-chip voltage overshoot, which could cause a total reset of all the parts of the processor.

19 Claims, 4 Drawing Sheets

SYSTEMS AND METHODS OF RESETTING A PROCESSOR

FIELD OF THE INVENTION

This invention relates to a method of resetting a processor and to a processor comprising multiple processor parts. It also relates to an integrated circuit comprising such a processor.

BACKGROUND OF THE INVENTION

In a typical microcontroller a reset scheme will be implemented whereby on receiving of a particular event the microcontroller will be reset. In more intelligent systems this scheme may be split into separate levels of reset, some of which may require that a portion of the chip still be functional during the reset.

The limitation is that this former type of reset may cause a voltage overshoot beyond the operational range of the chip due to the sudden drop in switching activity caused by clock frequency reduction (or stopping) and large portions of the logic being held in their reset state. The follow-on result is that a more severe level of reset may be triggered by this voltage overshoot, thus eliminating the advantages of having less severe levels of reset and making it difficult for software to determine the original cause of the reset.

The phenomenon described above has already been observed on 90 nm CMOS devices, and the trend towards smaller technologies and more cores on single chips is making the problem more acute. A solution that is currently used is a very cumbersome software sequence.

SUMMARY OF THE INVENTION

The present invention provides a method of resetting a processor as described in the accompanying claims. There is also provided a processor comprising multiple processor parts and a reset controller, and an integrated circuit comprising such a processor.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
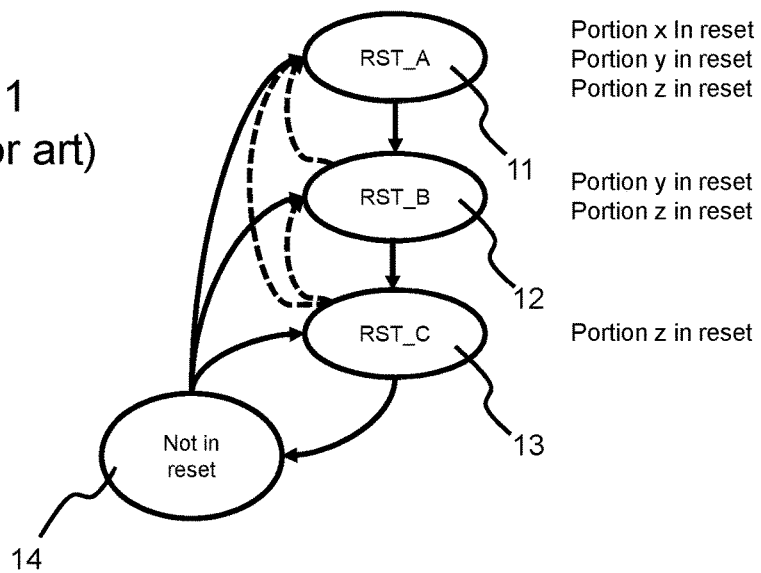
FIG. 1 shows a state diagram of a processor device reset sequence according to the state of the art.

FIG. 1 shows a state diagram of a processor device reset sequence according to the state of the art. This typical reset sequence 11, 12, 13 is as follows. When a reset event occurs while the processor device is not in reset, the reset sequence is entered based on the reset event's severity, see RST_A, RST_B, RST_C, where in RST_A portions x, y, z are in reset, and in RST_B portions y, z are in reset, and in RST_C only portion z is in reset.

Immediately upon entering the reset sequence 11, 12, 13 the reset of the "to be reset" portion(s) of the processor device occurs, and the clock frequency is reduced or even stopped. As the reset sequence progresses, some portions of the device may be released from reset at each step, until finally the last step is exited, and the entire chip is not in reset, see state 14. If a new reset event with a higher severity occurs while the reset sequence is active, the reset sequence may return to a prior step based on the event's severity. These possible returns are indicated in FIG. 1 by dashed lines.

Figure 2:
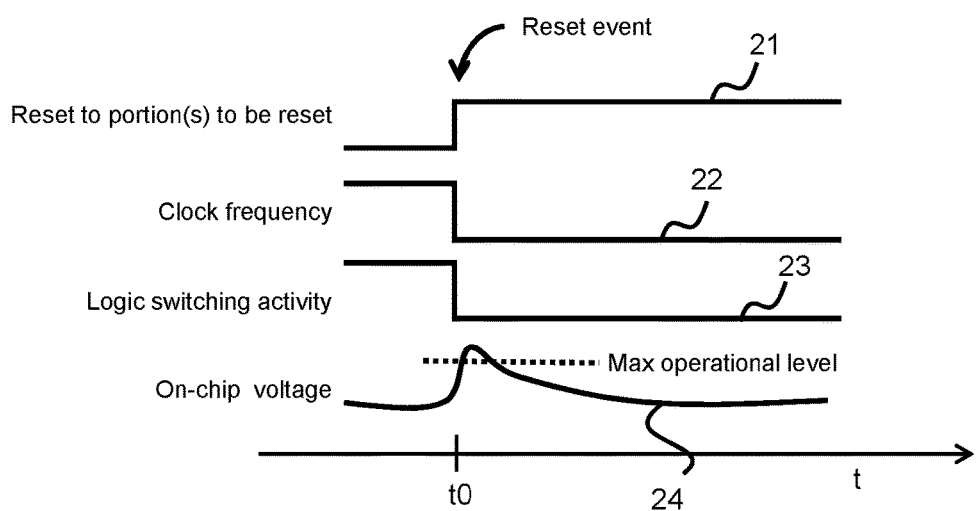
FIG. 2 shows graphs of a reset signal, a clock frequency, a switching activity and an on-chip voltage according to the state of the art.

FIG. 2 shows graphs of a reset signal 21, a clock frequency 22, a switching activity 23 and an on-chip voltage 24 according to the state of the art. The example of FIG. 2 may be the result of a processor device being reset by the scheme described with reference to FIG. 1. As can be seen from FIG. 2, due to the reset at t=t0, the switching activity is immediately reduced causing a temporary voltage overshoot beyond the maximum operational level, see dotted line in FIG. 2. This may result in a more severe level of reset being triggered, which is not wanted.

Figure 3:
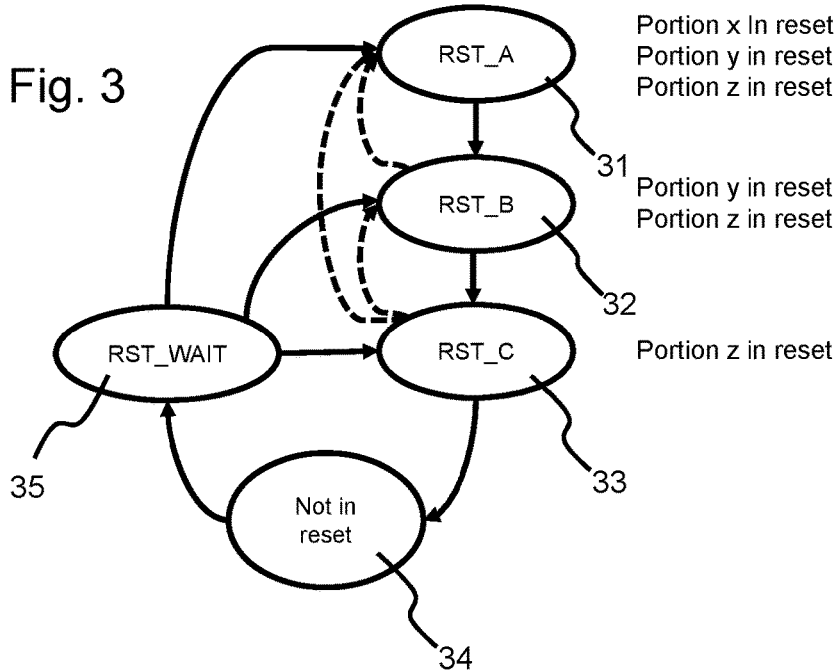
FIG. 3 shows a state diagram of a processor device reset sequence according to an embodiment.

FIG. 3 shows a state diagram of a processor device reset sequence according to an embodiment. In this example the reset sequence 31, 32, 33 is as follows. When a reset event occurs while the chip is not in reset, the new "RST_WAIT" state 35 is entered. During RST_WAIT, the portion that is to receive the delayed reset is not reset yet, but the rest is reset as per the target state RST_A, RST_B, or RST_C. Possibly an isolation between parts to be reset and parts not to be reset is activated. Furthermore a clock frequency ramp-down procedure is executed. When clock frequency ramp-down has completed, the 'usual' reset sequence 31, 32, 33 is entered at the step based on the original reset event's severity. If a new reset event occurs while in the processor device is in "RST_WAIT" state, the reset event with the highest severity determines at which step (i.e. 31, 32 or 33) the 'usual' reset sequence is entered.

Figure 4:
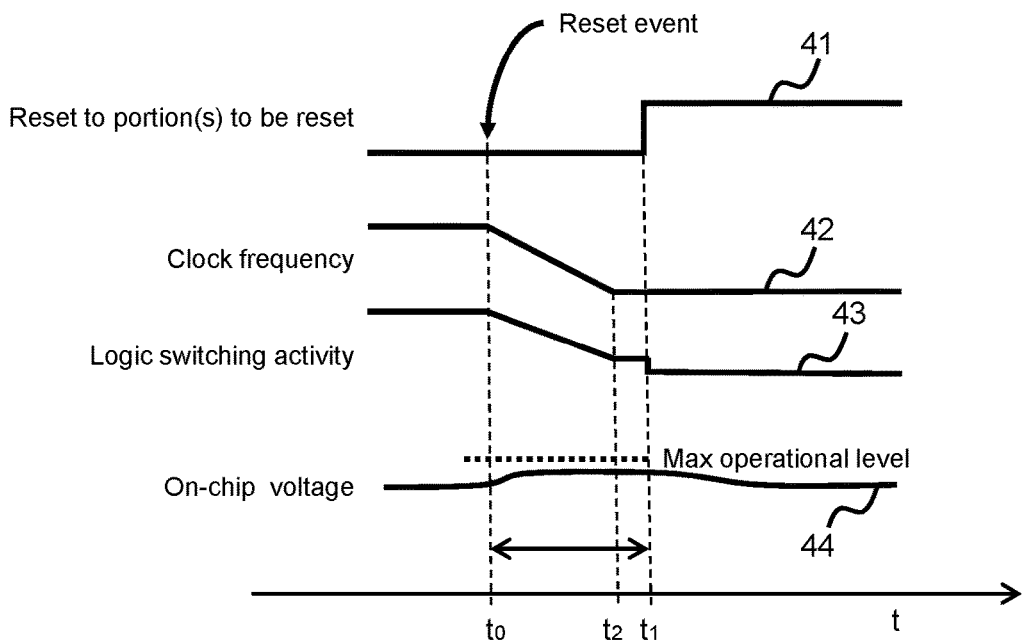
FIG. 4 shows graphs of an example of a reset signal, a clock frequency, a switching activity and an on-chip voltage according to an embodiment.

FIG. 4 shows graphs of an example of a reset signal 41, a clock frequency 42, a switching activity 43 and an on-chip voltage 44 according to an embodiment. The example of FIG. 4 may be the result of a processor device being reset by the scheme described with reference to FIG. 3. As can be seen from FIG. 4, due to the receiving of a reset signal at t=t0, the clock frequency 42 is gradually reduced. On the occurrence of a reset event, the actual reset of the 'to be reset' portion of the chip is delayed until after the clock frequency 42 has been ramped down to a 'reset frequency'. During this time, the portion of the chip that is to be reset is optionally isolated from the portion of the chip that is not to be reset so that this latter portion cannot be negatively impacted by the reset. Once the clock frequency 42 has completed its ramp-down, the portion of the chip that is to be reset is actually reset, see t=t1, and the reset sequence can proceed as usual. As can be seen in the example of FIG. 4, the forwarding of the reset is performed later than the actual moment (i.e. at t2) on which the frequency ramp-down has been completed. The time between t2 and t1 is simply the time it takes for a reset state machine to progress to the next state in which the reset is asserted. In principle, it could be immediate, too.

Figure 5:
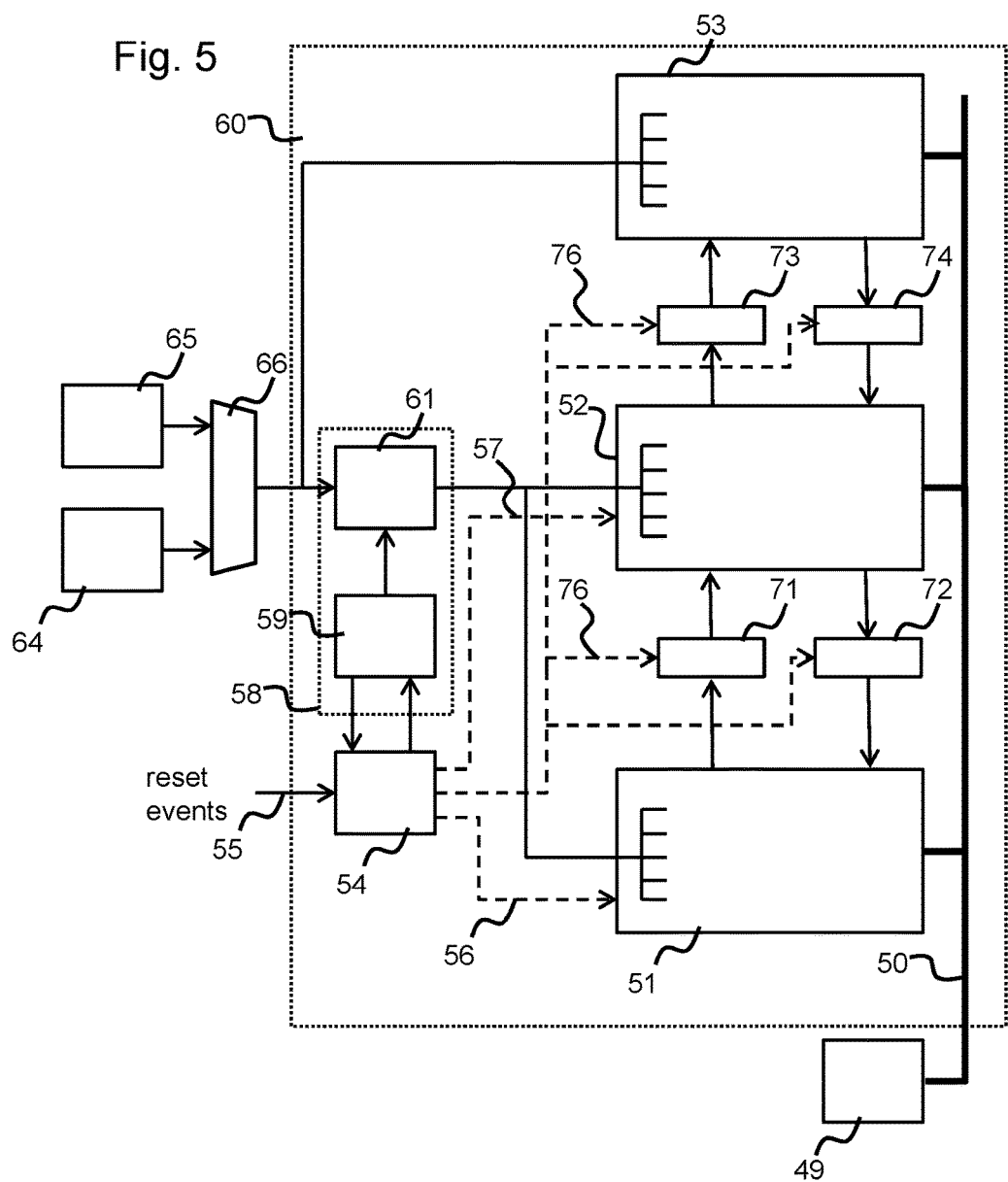
FIG. 5 schematically shows an example of a processor according to an embodiment.

FIG. 5 schematically shows an example of a processor 60 according to an embodiment. The processor 60 comprises multiple processor parts 51, 52, 53 and a reset controller 54. The processor parts may be processor cores of a multicore processor or any other parts of a processor, such as memory. The parts are powered by a voltage regulator 49, via power lines 50. The reset controller 54 is arranged for receiving a reset signal 55 indicating that one or more of the processor parts 51, 52 need to be reset. The reset controller 54 will forward the reset signal to the parts to be reset; in this example parts 51 and 52. In this example, the received reset signal is immediately forwarded to the first part 51, via signal line 56. The forwarding of the reset is delayed for a period of time for the second part 52, and sent via signal line 57. The third part 53 in this example will not be reset.

The processor 60 further comprises a frequency adapter 58 for gradually decreasing a clock frequency of the at least one of the parts to be reset. The frequency adapter 58 may comprise a ramp down control unit 59 arranged to control the gradually decreasing of the clock frequency, and a fractional clock divider 61 arranged to receive a control signal from said ramp down control unit 59, and to divide a clock signal received from a clock source. FIG. 5 shows some further blocks representing the system clock generation. The clock generation may comprise one or more clock sources 64, 65 (e.g., crystal oscillator, internal RC oscillator, PLL). FIG. 5 shows two clock sources, but it could be one or more. A multiplexer 66 is shown arranged for selecting which clock source 64, 65 is to be used as the system clock. Output of the multiplexer 66 is fed to the fractional clock divider 61 of the frequency adapter 58. It is noted that instead of using a fractional clock divider, any other mechanism to reduce the clock frequency gradually may be used.

Instead of directly resetting one or more parts, e.g. the part 51, and delaying the reset for others, e.g. the part 52, the reset controller 54 may be arranged to delay the forwarding for a period of time for all of the parts to be reset, thus the parts 51 and 52.

In the embodiment shown in FIG. 5, part 53 receives its clock frequency direct from a multiplexer 66, since there is no need to ramp down the frequency for this part. It should be noted that in a more dynamic variant, the third part 53 could receive its frequency also from the frequency adapter 58, in case the third part 53 needs to be reset in some other circumstances. So the frequency adapter 58 may be arranged to ramp down the frequency for certain parts, while delivering a normal frequency (i.e. produced by the multiplexer 66) to those parts that will not be reset.

In the embodiment of FIG. 5, the reset controller 54 is arranged to send an initialisation signal to the ramp down control unit 59 to initiate a frequency ramp down. Once the frequency ramp down has been completed, the ramp down control unit 59 will send a signal back to the reset controller 54 so that the delayed reset can be asserted. The delay time depends on the time it takes to ramp down the clock frequency, and this in turn may depend on an initial clock frequency, a maximum logic switching load, and voltage regulator/power supply response characteristics. In an embodiment, the forwarding of the reset signal is delayed for a predefined period of time. The predefined period of time may be defined for each of said parts to be reset.

In an embodiment the delay time may be longer for some parts than for other parts. For example, the reset controller 54 may be arranged to delay the forwarding of the reset signal in a consecutive way, wherein the forwarding of the reset signal is delayed for a first period of time for a first part and for a second period of time for a second part, wherein the first period of time is shorter than said second period of time. The forwarding of the reset signal may as well be delayed for a third part for a third period of time, where the third period of time is longer than the second period of time. In such an embodiment, a first part may for example be reset after a time t=2 msec, a second part after t=3 msec and a third part after 4 msec. In this way also the total activity of the processor device is gradually decreasing to avoid an on-chip voltage overshoot.

In the embodiment shown in FIG. 5, the processor further comprises a plurality of isolation units 71, 72, 73, 74 arranged to avoid signals going between different parts 51, 52, 53 of the processor. The processor may comprise an isolation controller arranged to activate the isolation units 71, 72, 73, 74. In this example the isolation controller is integrated in the reset controller 54, but the isolation controller may be a separate module in communication with the reset controller 54.

The isolation controller will send a control signal via signal lines, see dashed lines 76, to the different isolation units 71, 72, 73, 74. Once a rest signal for a specific processor part is received by the reset controller 54, an isolation control signal may be sent to those isolation units that can isolate the part to be reset from the other parts in communication with the part to be reset. This isolation will avoid that those parts not to be reset will negatively be impacted by the parts to be reset, especially during the clock frequency ramp-down time.

The frequency adapter 58 may be arranged to receive a clock signal from a clock source 65 and instructions from the reset controller 54. The frequency adapter 58 may be arranged to divide the clock frequency.

The embodiments described above allow the manipulation of the reset to a portion of the processor in conjunction with the frequency adapter 58 to prevent voltage overshoots due to sudden drop in frequency and switching activity on reset sequence entry. The solution can be implemented entirely with digital logic. An increase in availability of the processor parts is realized by preventing a less severe reset event, which would normally result in a quite short reset sequence, from resulting in a much longer reset sequence triggered by a high voltage detection.

The delay on the reset may be applied for all resets including both hardware and software reset events except a power on reset (POR) rather than only on software triggered resets. Also, the delay may be controlled by the frequency adapter operation in order to minimize impact on the voltage regulator 49 rather than, for example, the storing of data/configuration content prior to power-down.

Figure 6:
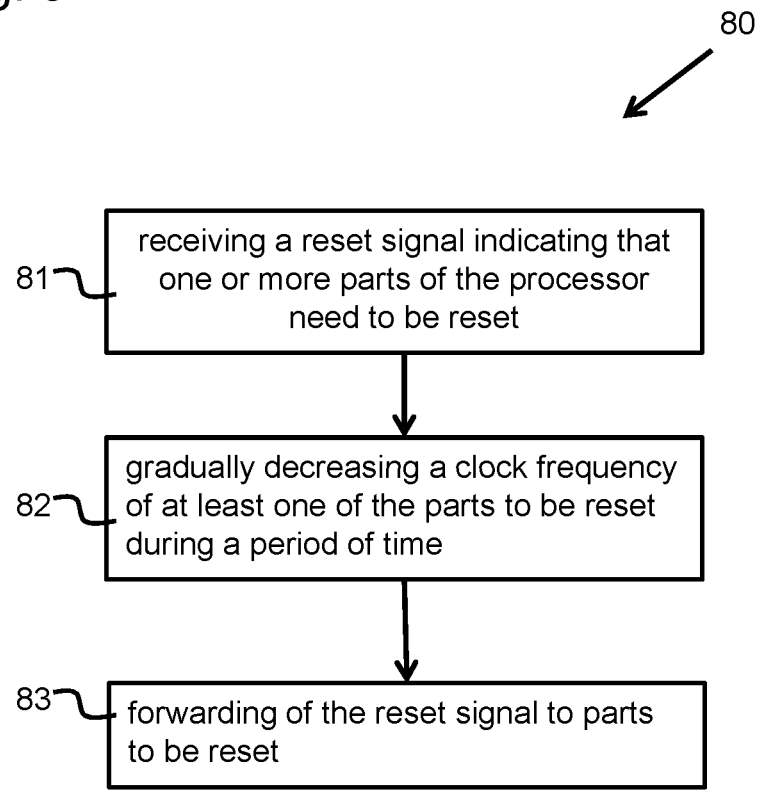
FIG. 6 shows a flow chart of the method according to an embodiment.

FIG. 6 shows a flow chart of the method according to an embodiment. The method 80 comprises the receiving of a reset signal indicating that one or more parts of the processor need to be reset, see step 81. The next step is a step 82 in which a clock frequency of at least one of the parts to be reset is gradually decreased during a period of time. The next step is a step 83 comprising the forwarding of the reset signal to parts to be reset.

So there is provided a method of resetting a processor, the method comprising the receiving a reset signal, see signal 55, indicating that one or more parts 51, 52 of said processor need to be reset, and forwarding of the reset signal to the parts 51, 52 to be reset, wherein the forwarding of the reset signal is delayed for a period of time for at least one of the parts 52 to be reset. A clock frequency of the at least one of the parts to be reset during this period of time is gradually decreased.

By using a combination of slow clock frequency ramp-down and delayed or staggered reset assertion in order to ensure that the logic switching activity is reduced slowly enough, the rate of change in the current drawn by that logic is small enough to be compensated by the power supply and/or voltage regulator. This prevents an overshoot of the on-chip voltage beyond the operational maximum voltage.

The forwarding of the reset signal may be delayed for the period of time for all of the parts 51, 52 to be reset. The method as described may further comprise the isolating of the parts to be reset by way of blocking processing signals from and to other parts of the processor that are not to be reset. The isolating of the parts to be reset may be done before the parts to be reset are in reset state. The one or more parts may comprise at least one processor core. The parts may also be any other type of logic or memory element.

Figure 7:
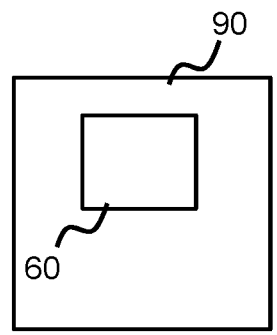
FIG. 7 shows an integrated circuit according to an embodiment.

FIG. 7 shows an integrated circuit 90 according to an embodiment. The integrated circuit 90 may comprise the processor 60 according to one or more of the embodiments described above.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of resetting a processor, the method comprising:
   receiving a reset signal indicating that one or more parts of said processor need to be reset,
   gradually decreasing a clock frequency of said at least one of the parts to be reset;
   forwarding of said reset signal to said parts to be reset, wherein said forwarding of said reset signal is delayed for a period of time for said at least one of the parts to be reset.

2. A method according to claim 1, wherein said forwarding of said reset signal is delayed until after said clock frequency has been decreased to a reset frequency.

3. A method according to claim 1, wherein said forwarding of said reset signal is delayed for a predefined period of time.

4. A method according to claim 3, wherein said predefined period of time is defined for each of said parts to be reset.

5. A method according to claim 1, wherein said forwarding of said reset signal is delayed for said period of time for all of the parts to be reset.

6. A method according to claim 1, wherein said forwarding of said reset signal is delayed for a first period of time for a first part and for a second period of time for a second part, wherein said first period of time is shorter than said second period of time.

7. A method according to claim 6, wherein said forwarding of said reset signal is delayed for a third part for a third period of time, said third period of time being longer than said second period of time.

8. A method according to claim 1, said method further comprising:
   isolating said parts to be reset by way of blocking processing signals from and to other parts of said processor that are not to be reset.

9. A method according to claim 8, wherein said isolating of said parts to be reset is done before said parts to be reset are in reset state.

10. A method according to claim 8, wherein said one or more parts comprise at least one processor core.

11. A processor comprising multiple processor parts and a reset controller configured to:
    receive a reset signal indicating that one or more parts of said processor parts need to be reset;
    forward of said reset signal to said parts to be reset;
    delay said forwarding for a period of time for at least one of the parts to be reset, said processor further comprising a frequency adapter configured to gradually decrease a clock frequency of said at least one of the parts to be reset.

12. A processor according to claim 11, wherein said frequency adapter comprises a ramp down control unit arranged to control said gradually decreasing of said clock frequency, and a fractional clock divider arranged to receive a control signal from said ramp down control unit, and to divide a clock signal received from a clock source.

13. A processor according to claim 11, wherein said reset controller is arranged to delay the forwarding for said period of time for all of the parts to be reset.

14. A processor according to claim 11, wherein the said period of time is longer for some parts than for other parts.

15. A processor according to claim 11, wherein said reset controller is arranged to delay said forwarding of said reset signal in a consecutive way.

16. A processor according to claim 11, wherein the frequency adapter is arranged to ramp down the frequency for certain parts, while delivering a normal frequency to those parts that will not be reset.

17. A processor according to claim 11, said processor further comprising:
a plurality of isolation units arranged to avoid signals going between different parts of said processor;
an isolation controller arranged to activate said isolation units.

18. A processor according to claim 11, wherein said frequency adapter is arranged to receive a clock signal from a clock source and instructions from said reset controller and arranged to divide said clock frequency.

19. An integrated circuit comprising a processor according to claim 11.

* * * * *